Nov. 12, 1946.　　　　R. D. ACTON　　　　2,410,918
CONTROL MEANS FOR TRACTOR-CONNECTED IMPLEMENTS
Filed March 22, 1944　　　6 Sheets-Sheet 1

Inventor
Russel D. Acton
By Paul O. Pippel
Atty.

Nov. 12, 1946.   R. D. ACTON   2,410,918
CONTROL MEANS FOR TRACTOR-CONNECTED IMPLEMENTS
Filed March 22, 1944   6 Sheets-Sheet 2

Inventor
Russel D. Acton
By Paul O. Pippel
Atty.

Nov. 12, 1946.     R. D. ACTON     2,410,918
CONTROL MEANS FOR TRACTOR-CONNECTED IMPLEMENTS
Filed March 22, 1944     6 Sheets-Sheet 3

Inventor:
Russel D. Acton.
By Paul O Pippel
Atty.

Nov. 12, 1946.    R. D. ACTON    2,410,918
CONTROL MEANS FOR TRACTOR-CONNECTED IMPLEMENTS
Filed March 22, 1944    6 Sheets-Sheet 4

Inventor:
Russel D. Acton.
By Paul O. Pippel
Atty.

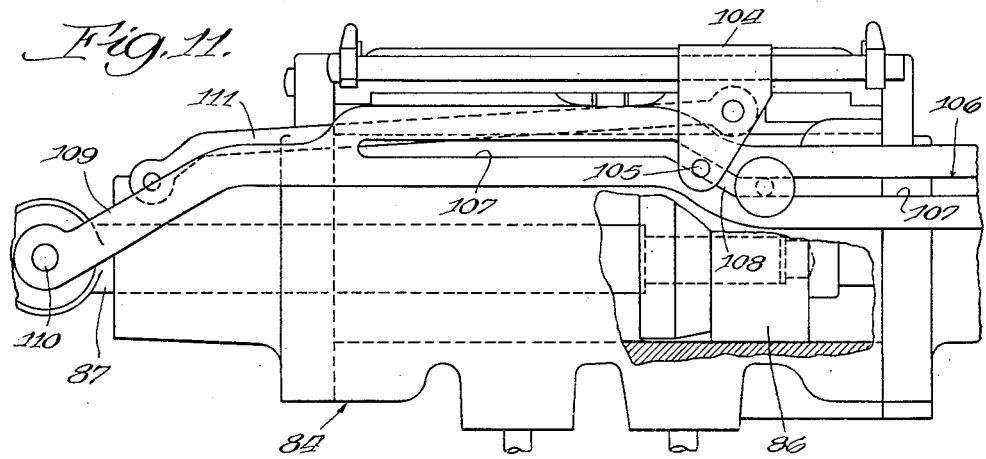
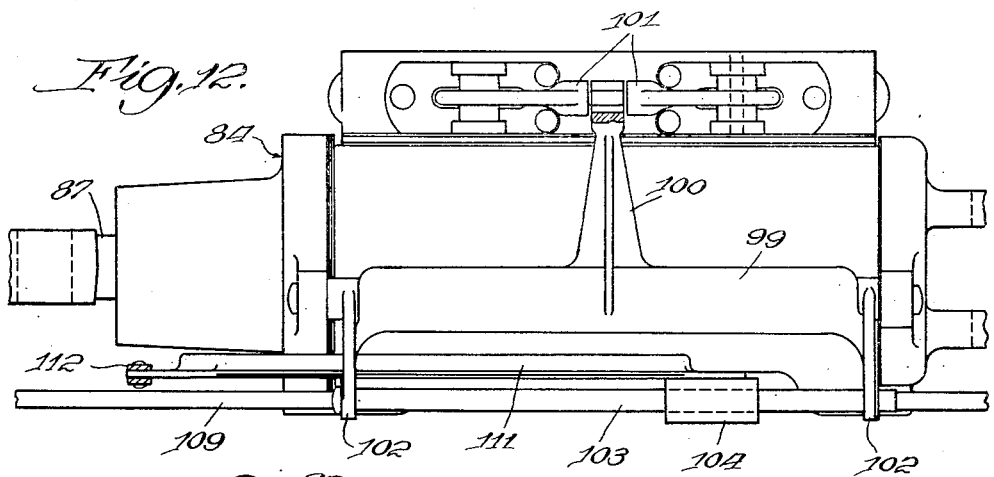
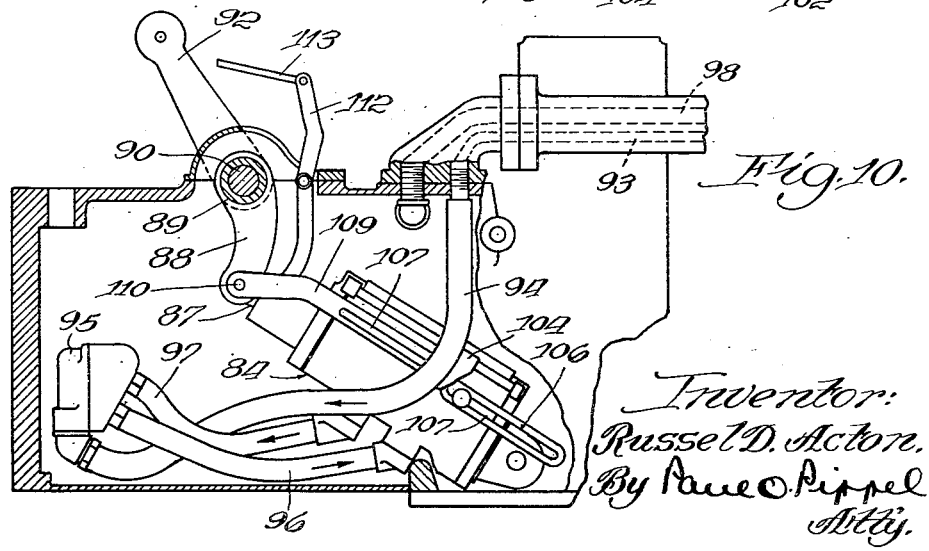

Patented Nov. 12, 1946

2,410,918

UNITED STATES PATENT OFFICE 2,410,918

CONTROL MEANS FOR TRACTOR-CONNECTED IMPLEMENTS

Russel D. Acton, Chicago, Ill., assignor to International Harvester Company, a corporation of New Jersey Application March 22, 1944, Serial No. 528,672

34 Claims. (Cl. 97—50)

This application is a continuation in part of my copending application Serial No. 407,552, filed August 20, 1941.

The present invention relates to a control means for a tractor-connected implement. More specifically, it relates to fluid-pressure means for controlling or adjusting a tractor-mounted or a trail-behind implement.

It is known to provide a tractor-connected implement with a fluid-power device for adjusting and controlling the implement, the device being actuated by the power of the tractor. With such an arrangement there is normally a hose for fluid running from the tractor to the implement. The disadvantage is that when the implement is disconnected from the tractor the fluid-power means must also be disconnected from the implement or from the tractor or from both, and this normally requires a disconnection of a line or conduit through which fluid is passed. With the break of a fluid line there is considerable danger of loss of the fluid. In the present invention the fluid power means is removed without breaking of the fluid-carrying line.

An object of the present invention is to provide an improved control means for a tractor-connected implement.

Another object is the provision of a unit type hydraulic power-transmitting device particularly adapted for adjusting a tractor-connected implement from a power lift mechanism.

A further object is the provision of an improved pressure-fluid means for adjusting a trail-behind tractor-connected implement from the tractor.

Another object is to provide a plurality of remote controls for tractor-connected implements whereby structure or elements functioning independently of each other may be separately adjusted.

According to the present invention, a special detachable unit comprising a first cylinder with a piston therein, a second cylinder with a piston therein, and a connecting conduit is mounted so that one cylinder is upon a tractor and the other cylinder is upon or connected to an implement carried by or connected to the tractor. The piston in the cylinder on the tractor is shifted in the cylinder by power derived from the tractor power plant acting through external mechanical means on the tractor. When the implement is to be disconnected from the tractor, the one cylinder is disconnected from the implement, and the disconnection of the cylinder and the piston on the tractor from the source of tractor power is made at the external mechanical means through which power is supplied to the cylinder of the piston. Thus, there is no disconnection through a fluid line, and the disadvantages of such a disconnection are avoided. Moreover a hydraulic or mechanical power-lift mechanism as supplied on many tractors can be utilized to adjust flexibly connected implements with ease and accuracy.

In the drawings:

Figure 10 is a vertical section of the central portion of the tractor body of Figure 9 showing the hydraulic lift construction;

Figure 11 is a side elevation of the cylinder construction shown in Figure 10; and Figure 12 is a plan view of the cylinder construction shown in Figure 11.

Figure 1:
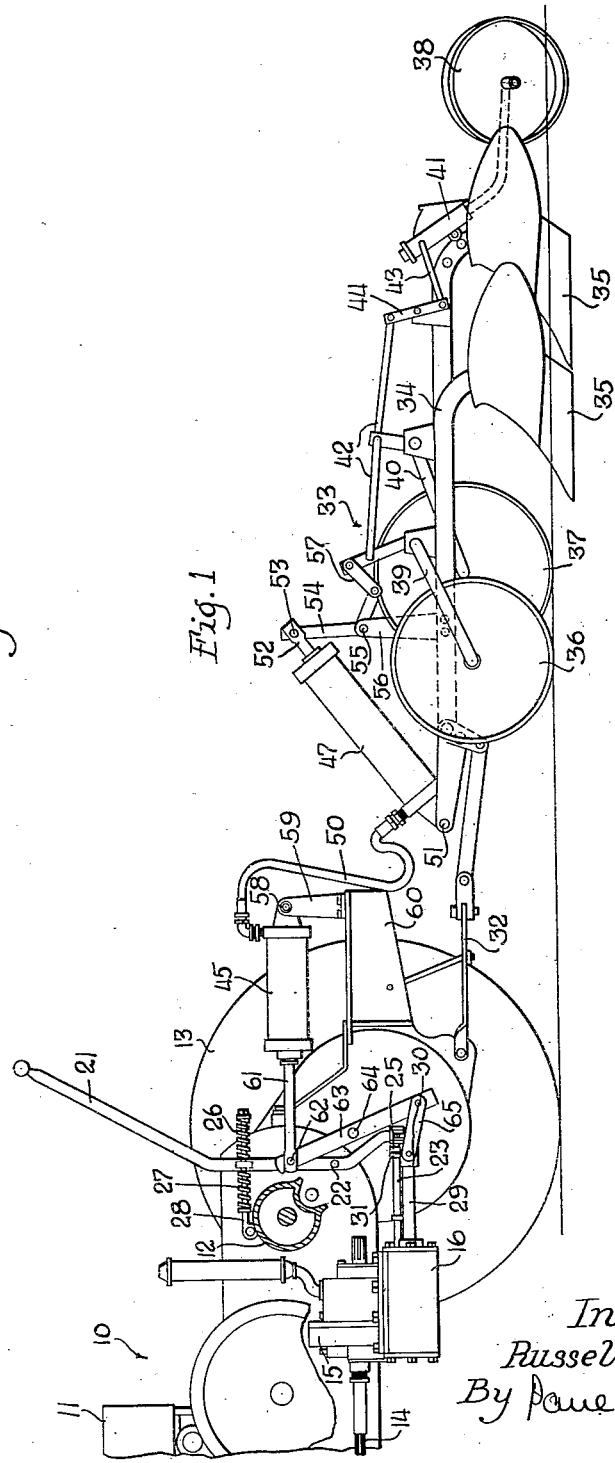
Figure 1 shows a side view of a tractor with parts removed, and a plow connected at the rear of the tractor.
Figure 3:
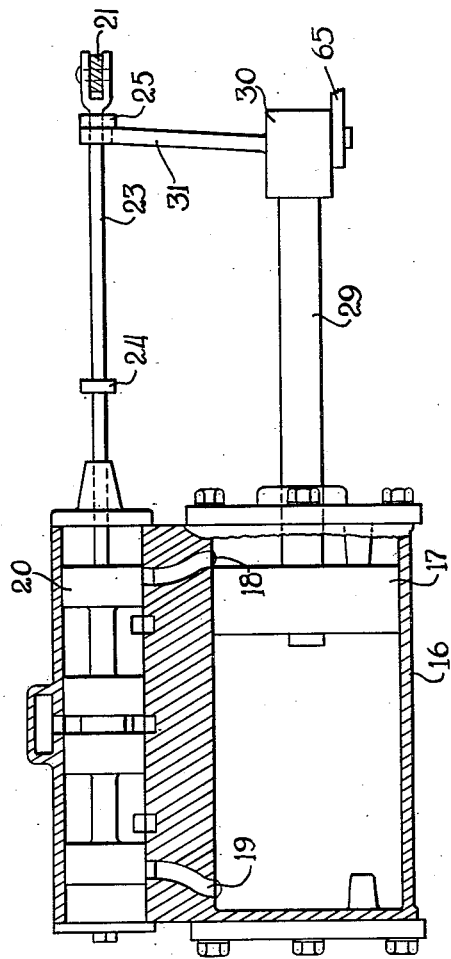
Figure 3 is a sectional view taken through a part of the tractor of Figure 1.

In the drawings, reference character 10 designates a conventional type of tractor having a body 11, rear axle 12, and rear wheels 13 of which only one is shown. The tractor carries a power take-off shaft 14, fluid pump 15 actuated by the power take-off shaft 14, and a cylinder 16. This arrangement of parts is more completely shown in the patent to Brown 1,929,804, October 10, 1933. Briefly stated, a piston 17, as shown in Figure 3, is slidably mounted in the cylinder 16. The piston is movable within the cylinder in response to fluid under pressure supplied to the cylinder by the pump 15 through ports 18 and 19 controlled by a valve 20. The valve 20 is under control of a hand lever 21 pivoted at 22 on the tractor and connected with the valve by a rod 23 extending from the valve. There are stop shoulders 24 and 25 on the rod 23. The lever 21 is held in a central neutral position, as shown in Figure 1, by the action of springs 26 and 27 mounted upon a member 28 extending through the lever 21. When the lever 21 is in the central neutral position of Figure 1, the valve 20 is in a corresponding neutral position in which the ports 18 and 19 are closed, and fluid within the cylinder 16 on both sides of the piston 17 is locked in the cylinder. Figure 3 shows the piston 17 to be at the right end of the cylinder 16. When the piston is to be moved to the other end, the hand lever 21 is actuated to move the valve 20, leaving the ports 18 and 19 uncovered so that fluid under pressure may be admitted to the port 18 and allowed to escape through the port 19.

Extending from the piston 17 is a rod 29 having an enlarged portion 30 at its end from which extends transversely a member 31 having an opening through which the rod 23 extends. The stop shoulders 24 and 25 are abutted by the member 31 as the piston 17 moves in one direction or another, and when the piston has reached the end of the cylinder, the member 31 will have abutted one stop shoulder and will thereby force the valve 20 into a neutral position in which both ports 18 and 19 are closed. When the piston 17 is being moved in one direction or another, the hand lever 21 must be held away from the neutral position so that the valve 20 opens the ports. When the hand lever 21 is released, the springs 26 and 27 immediately return the lever to a neutral position and also return the valve 20 to a neutral position. Thus, movement of the piston 17 is stopped. With the valve 20 in neutral position the ports 18 and 19 are closed so that fluid is neither admitted to the cylinder nor allowed to escape therefrom, and the piston is held locked. In this way the piston may be moved from one end of the cylinder to the other and may be locked in any desired position either at the ends of the cylinder or at any point intermediate the ends.

The tractor 10 carries a draw-bar 32 to which a plow 33 is floatingly connected. The plow 33 comprises beams 34, plow bottoms 35, wheels 36, 37, and 38 connected to the beam by cranks 39, 40, and 41. The cranks are interconnected by means of links 42 and 43 and a lever 44. Figure 1 shows the plow bottoms in working position. When the plow is to be transported, the cranks 39, 40, and 41 by which the wheels are connected are swung with respect to the plow beams 34 so that the beams are raised. Raising of the plow to transport position is accomplished by a special flexible unit now to be described.

Figure 2:
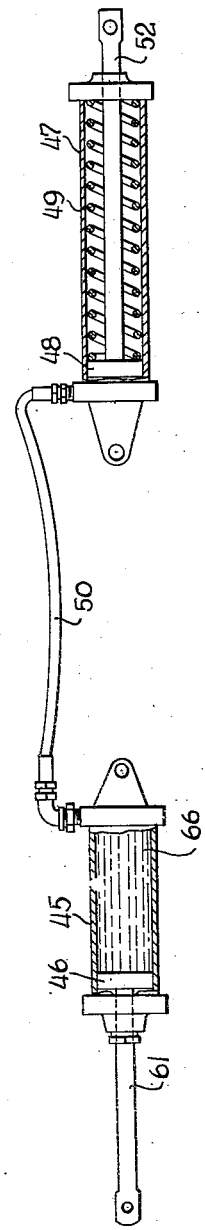
Figure 2 is a detail view showing the special unit of the present invention by which the plow is adjusted from the tractor.

As seen in Figures 1 and 2, this unit comprises a structure having a cylinder 45 with a plunger in the form of a piston 46 slidable therein, a structure having a cylinder 47 with a plunger in the form of a piston 48 slidable therein, a spring 49 urging the piston into the position shown in Figure 2, and a conduit 50 which serves to confine a pressure or power-transmitting medium connecting the two cylinders. The cylinder 47 is connected to the plow 33, as indicated at 51. A rod 52 connected with the piston 48 extends from the cylinder 47 and is connected at 53 with a bell crank 54 pivoted at 55 on a bracket 56 secured to the plow beams 34. The bell crank 54 is connected with the crank axle 39 by a link 57. The cylinder 45 is connected at 58 to a bracket 59 secured to a structure 60 at the rear of the tractor 10. A rod 61 connected with the piston 46 extends from the cylinder 45 and is connected at 62 to a lever 63 pivoted at 64 on the tractor 10. The lever 63 is connected with the rod 29 attached to the piston 17 by means of a link 65. Fluid, as indicated at 66, is contained in the cylinder 45, the conduit 50, and the cylinder 47. By virtue of the connection between the piston 17 in the cylinder 16 and the piston 46 in the cylinder 45 movement of the piston 17 in the cylinder 16 under the action of fluid under pressure supplied to the cylinder 16 by the pump 15 is transmitted to the piston 46. Thus, as the piston 17 is moved from the extreme right position of Figure 3, it serves to move the piston 46 from the extreme left position of Figure 2. As the piston 46 moves from this position, the fluid 66 is forced from the cylinder 45 through the hose 50 into the cylinder 47, and the piston 48 is moved to the right against the action of the spring 49. Thus, the crank axles 39, 40, and 41 are caused to rotate so that the plow 33 is raised. When the plow is to be lowered, the piston 17 is moved to the right and the piston 46 to the left. Thus, the piston 48 may also move to the left under the action of the spring 49 and the weight of the plow bottoms 35, and the plow bottoms 35 are permitted to engage the ground again. As previously stated, the piston 17 may be held in any position intermediate the ends of the cylinder 16. Consequently, the pistons 46 and 48 will be held in an intermediate position, and the plow bottoms 35 may assume a position intermediate the lowest working position and the highest transport position. In ths way the operating depth of the plow bottoms 35 may be controlled.

The cylinders 45 and 47 with their pistons and rods and the conduit 50 may be considered as a special unit which is disconnectable from the tractor 10 and the plow 33, as shown in Figure 2. Obviously, all that is required for this disconnection is the disconnection of the cylinder 47 from the point 51 on the plow, the disconnection of the rod 52 from the bell crank 54, the disconnection of the cylinder 45 from the point 58 on the tractor, and the disconnection of the rod 61 from the lever 63. Thus, removal of the unit is possible without a breaking of the fluid line, and this is possible because external mechanical means connects the cylinder 45 and piston 46 and the tractor power plant which may be regarded as the power take-off shaft 14, the pump 15, and the cylinder 16. This external mechanical means may be considered to be the link 65 and lever 63 connecting the rod 29 and rod 61 attached to the piston 17 and piston 46, respectively.

Figure 4:
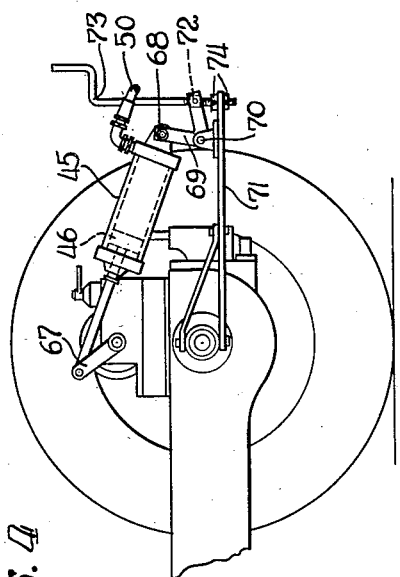
Figure 4 is a side view generally similar to Figure 1 but with the implement omitted and a modified means for actuating the special unit shown in Figure 2.

Figure 4 shows the cylinder 45 and the piston 46 connected to a different form of tractor-actuated power means. As shown in this figure, the actuated power means is a crank 67 which is rotated between extreme positions 180° apart by mechanical or by fluid power means, as shown in the patent to Johnston 2,039,891, May 5, 1936. With this type of actuating means the crank 67 can be locked or held only in two extreme positions, and thus for an adjustment of the positions between which the plow or other implement connected to the tractor can be shifted, a shifting of the cylinder 45 is required. As seen in Figure 4, the cylinder 45 is connected at 68 to one arm of a bell crank 69 pivoted at 70 on a tractor draw-bar 71. The other arm of the bell crank 69 is connected to a nut 72 threaded upon a crank 73 adjustably secured to the draw-bar 71 by nuts 74. By means of the crank 73 there may be a lowering or raising of the one arm of the bell crank 69 and a horizontal shifting of the other arm of the bell crank 69 to which the cylinder 45 is attached. Thus, for the two extreme positions of the crank 67 there is adjustment of the extreme positions of the piston 46 within the cylinder 45 and an adjustment of the extreme positions of the piston within the cylinder on the implement, not shown.

Figure 5:
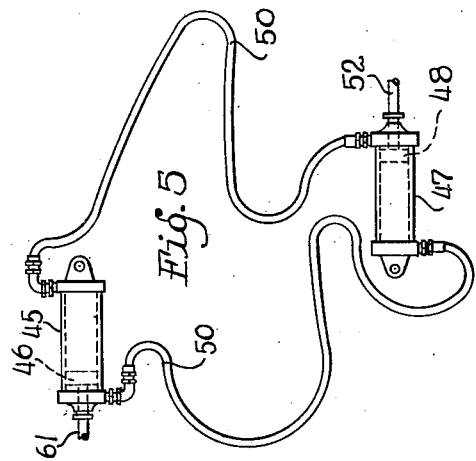
Figure 5 is a detail view showing a modified form of unit.

Figure 5 shows a modified form of detachable unit in which the cylinders 45 and 47 are connected by two conduits 50. Thus, the spring 49 of the device of Figure 2 which insures the movement of the piston 48 to the left end of the cylinder 47 is unnecessary, for the shifting of the piston 46 in either direction causes a corresponding shifting in either direction of the piston 48, since there is pushing by fluid in both directions.

Figure 6:
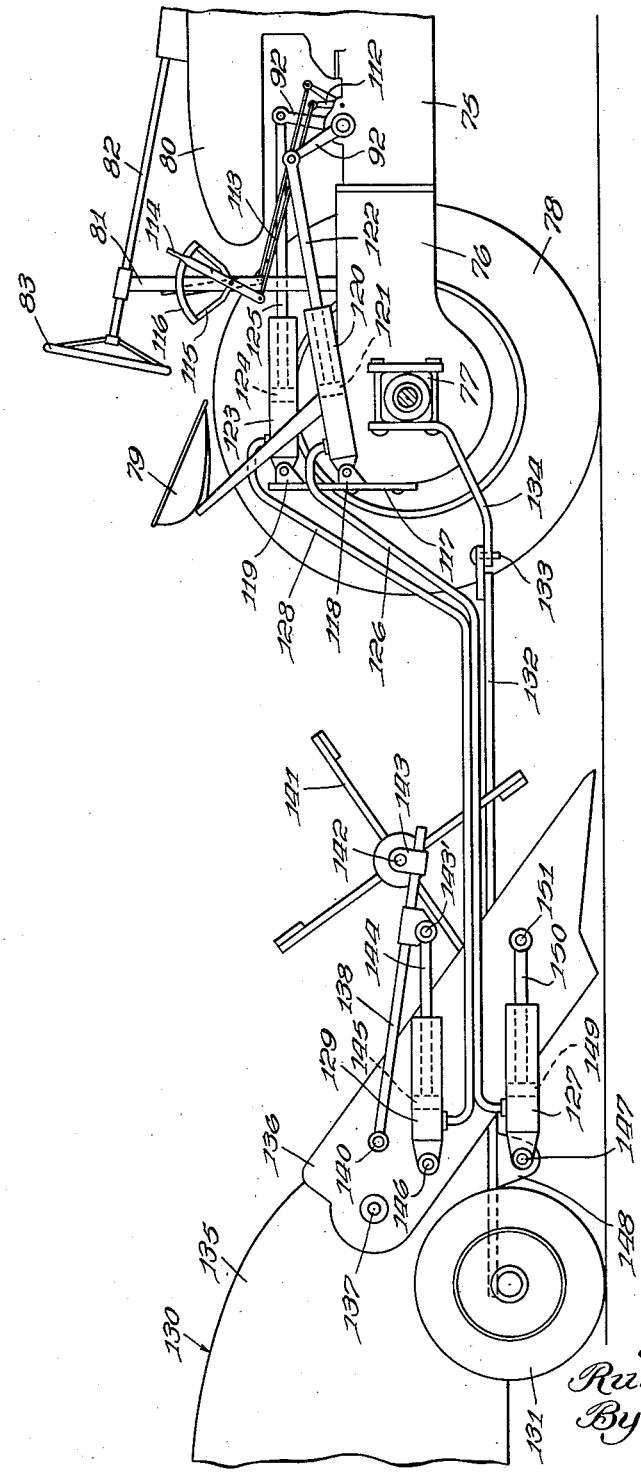
Figure 6 is a side view of a tractor with a harvesting machine attached thereto incorporating a modification of the invention in which two push tool hydraulic devices are utilized.
Figure 7:
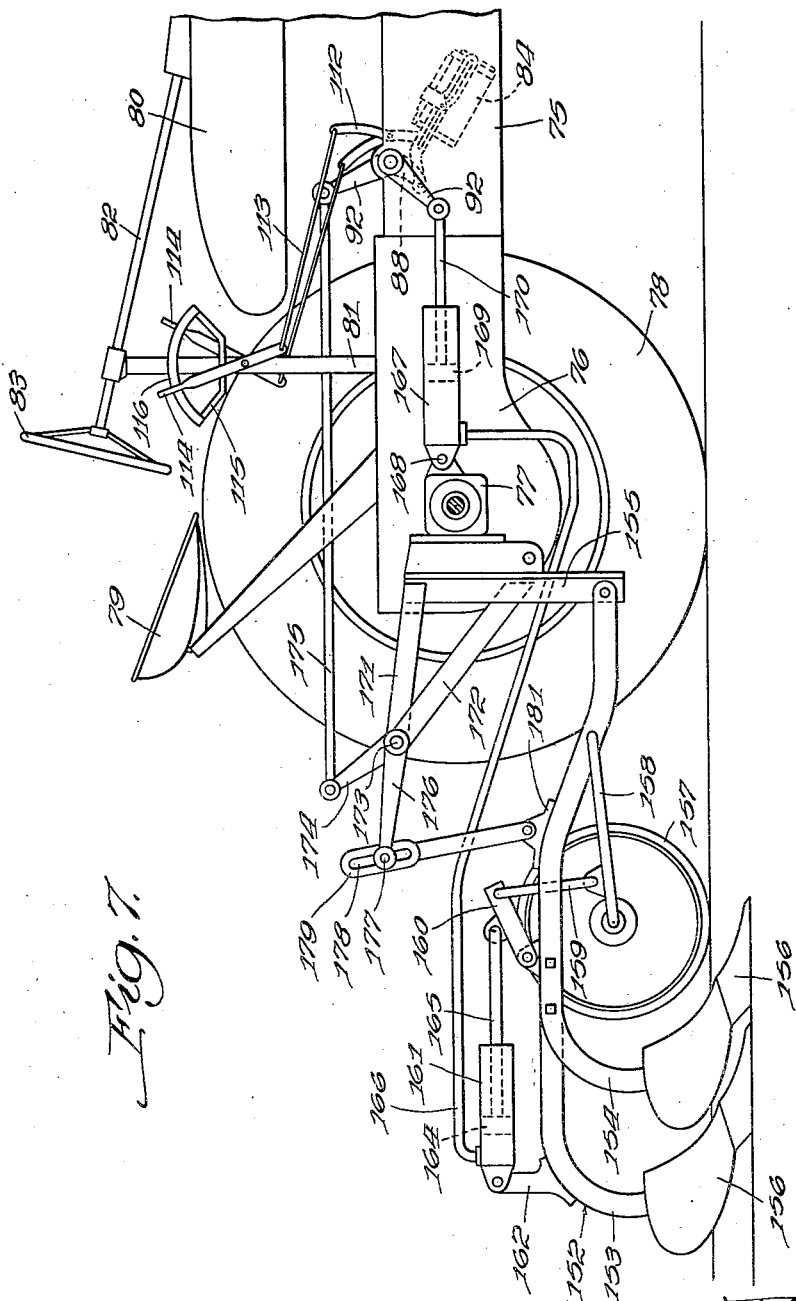
Figure 7 is a side view of a tractor with a plow attached thereto having a gauge wheel, whereby two independent power-lift mechanisms may be used for regulating and lifting the plow.
Figure 8:
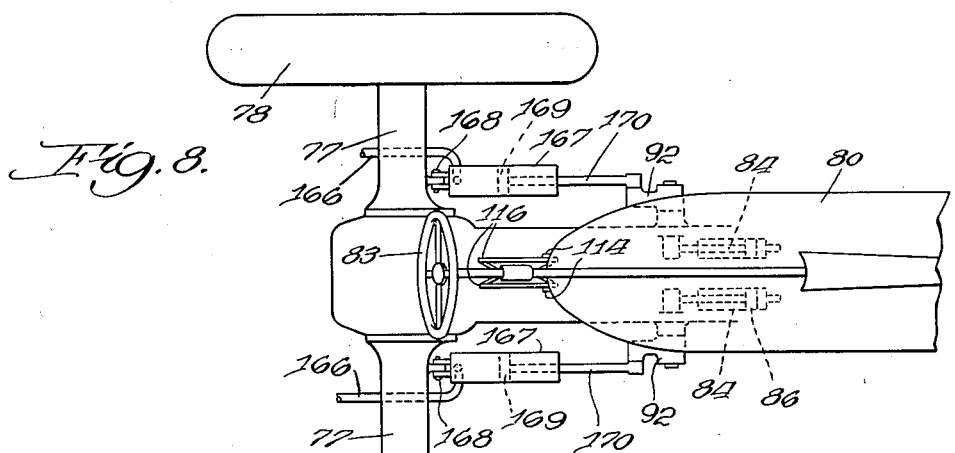
Figure 8 is a plan view of the tractor shown in Figure 7 with two separate power-lift cylinders indicated in dotted lines.

In the modifications shown in Figures 6 and 7, a tractor is utilized having a double power lifting arrangement as shown in Figures 8, 9, 10, 11, and 12. In said figures, the rock-shafts and the independent cylinders are clearly shown as well as certain significant parts of the operating means which provide for independent manual operation of either of the lifting arms. The details of the valves are not shown in detail, as this invention is concerned with the transmission of power from the independent lifting arms to implements connected to the tractor. The power lift construction and all the operating elements thereof are disclosed in application, Serial No. 466,463, filed November 21, 1942.

Figure 9:
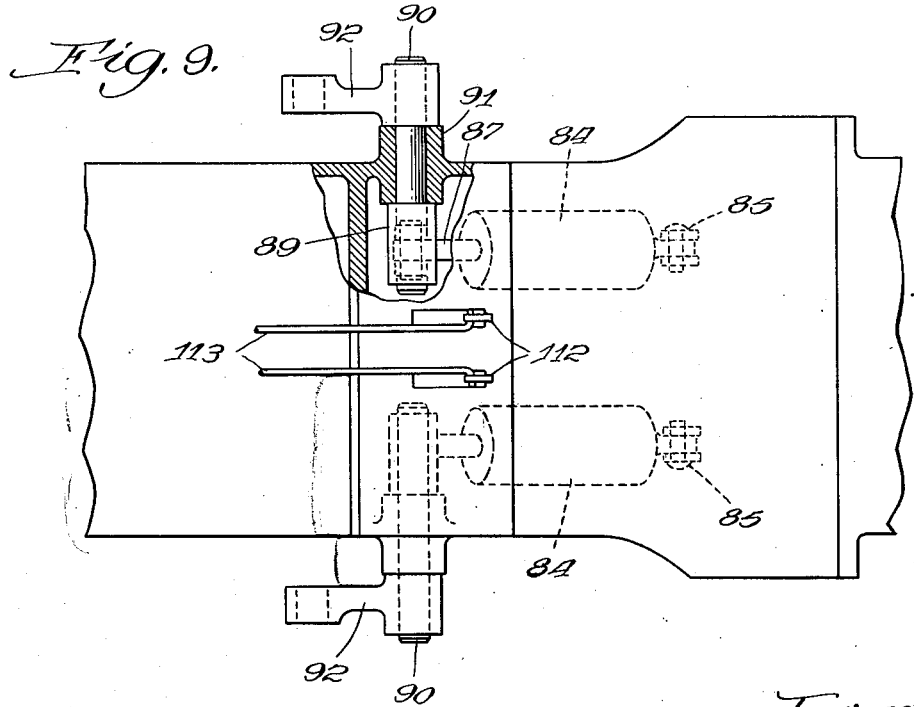
Figure 9 is an enlarged plan view of the central body portion of the tractor shown in Figure 8.

The tractor shown in Figures 6 to 10, inclusive, includes a narrow central body portion 75 and a rear body portion 76 from which extended rear axle structures 77 extend. Traction wheels 78 are mounted on axles carried by the axle structures 77. Certain other parts of the tractor are shown including an operator's station 79, a gasoline tank 80, a steering column support 81, a steering column 82, and a steering wheel 83. As indicated by dotted lines in Figures 7, 8, and 9, the central body portion 75 contains a pair of power lifting cylinders 84. Each of said cylinders is pivotally connected to a bracket 85 rigid with respect to the body portion 75. Each of the cylinders, as shown in Figures 9 and 10, is also provided with a conventional piston 86 connected by a piston rod 87 with a crank arm 88 carried by a sleeve 89. The sleeve 89 is secured to a shaft 90 rotatably mounted in a journal portion 91 formed in the casting of the body portion 75. A power lift arm 92 is connected to each of the shafts 90. It will be understood that the lifting arm 92 may be connected at any angular position on the shaft 90 either extending upwardly or downwardly, both positions being illustrated in Figure 7 by the lifting arms at opposite sides of the tractor.

Figures 10, 11, and 12 show some of the details of a follow-through type of lifting mechanism disclosed and claimed in the application previously referred to. Such a mechanism is particularly adapted for use with the push-pull hydraulic mechanism for implements which forms the subject-matter of the invention of this application. Referring to Figure 10, a source of fluid pressure such as a pump mounted on the tractor and driven by the power plant thereof supplies fluid under high pressure through a conduit 93 to a conduit 94 which leads to a distributing chamber 95. From said chamber the fluid under high pressure is delivered from a conduit 96 to a valve mechanism for controlling the delivery of fluid to and from either end of the cylinder. Fluid released from the cylinder at low pressure is delivered through a conduit 97 to the distributing chamber 95 and therefrom through a conduit, not shown, to a low pressure conduit 98 which leads back to the source of fluid under pressure. A valve control member 99 pivoted on a longitudinal axis at the top of the cylinder has an operating extension 100 which is positioned to operate either of two valve actuating elements 101. Each of said elements is operable to supply fluid under pressure to one end of the cylinder and to simultaneously release fluid from the other end of the cylinder. The control member 99 is also provided with a pair of extensions 102 which carry a rod 103 on which a member 104 is mounted, said member depending downwardly as best shown in Figure 11. Said member 104 is provided with a pin 105 which slidably rides in a slot 106. Said slot is formed with two spaced parallel portions 107 and an angular portion 108 joining the parallel portions. Said slots are formed in a follow member 109, which is connected to the pivot pin 110 which joins the connecting rod 87 and the arm 88.

The member 104 is slidable on the rod 103 and is connected to an actuating member 111 which is pivotally connected to a lever 112 pivoted on the body portion 75 forwardly of the pivot axis of the shaft 90. An actuating rod 113 is pivotally connected to the upper end of the lever 112 and to the lower end of a manually rockable lever 114 pivoted on a bracket 115 carried by the steering column support 81. The lever 114 is shiftable over a quadrant 116. The position of the lever on the quadrant through the linkage above described determines the position of the member 104. When the lever 114 is moved, the member 104 depending upon its direction of movement rides up the angular slot 108 into the slot 106 to operate the cylinder to move the corresponding lifting arm 92 in one position. When the member 104 is moved in the other direction into the slot 106, the lifting arm 92 is moved in the other direction. Following movement of the member 104 out of its neutral position midway of the angular slot 108, the piston moves until the follow member 109 moves to the extent that the pin 105 is again located in the central portion of the slot 108. This construction enables the operator to pre-select any predetermined position of the arm 92 by moving the lever 114 to a corresponding position. As there are two complete lifting cylinders, each having its lifting arm 92 and manual control lever 114, it is to be understood that either may be independently operated at any time.

Referring to Figure 6, a bracket structure 117 at the rear of the body portion 76 of the tractor extends upwardly including two brackets 118 and 119. An hydraulic cylinder 120 is pivotally connected to the bracket 118, a piston 121 in the cylinder having a piston rod 122 extending from the cylinder and pivotally connected to one of the lifting arms 92. A second cylinder 123 is pivotally connected to the upper bracket 119. A piston 124 in the cylinder 123 has a piston rod 125 extending forwardly to a point of pivotal connection to the second lifting arm 92.

A flexible conduit 126 connected to the cylinder 120 extends rearwardly to a point of connection with a cylinder 127. A flexible conduit 128 extends rearwardly to a point of connection with a cylinder 129.

A harvester thresher illustrated in outline has been shown as being connected to the tractor at the rear thereof. Said harvester thresher, indicated in its entirety by the reference character 130, is carried on supporting wheels provided with rubber tires, one of which 131 is shown in the drawings. A frame structure 132 extending forwardly from the harvester thresher is connected by a pin 133 with a draw-bar structure 134 rigidly secured to the rear axle extension 77 of the tractor. The harvester thresher is conventional in the art and includes principally a thresher part 135 and a harvester part 136 pivotally mounted at 137 on the thresher part. A reel structure includes a frame 138, one side of which, shown in the drawings, is pivotally connected at 140 to the harvester part 136. A reel 141 is rotatably carried by the frame 138. Said reel is mounted on a shaft 142 journaled in brackets 143 mounted on the forwardly extending portions of the frame 138. A bracket 143', mounted on a portion of the frame structure 138, provides an attachment point for a piston rod 144 connected to a piston 145 mounted in the cylinder 129. The cylinder itself is pivotally connected at 146 to the harvester part 136 at a point spaced from the pivotal connecting point 140 of the reel frame. It will be understood, therefore, that the movement of the piston 145 relative to the cylinder 129 vertically adjusts the reel structure with respect to the harvester part 136. Such adjustment is necessary during the operation of a harvester thresher due to the adjustment of the harvester part which will be hereinafter described and due to the height and type of grain being harvested.

The cylinder 127 is pivotally connected at 147 with a bracket 148 depending downwardly from the draft frame structure 132. A piston 149 in the cylinder 127 is provided with a piston rod 150 which is pivotally connected at 151 with the harvester part 136. It will be understood that any movement of the piston 149 relative to its cylinder 127 will vertically adjust the harvester part 136. This adjustment is necessary in the operation of a harvester thresher and is frequently used during passage through the field due to the variation in the type of grain and the type of undergrowth in the grain.

When an operator is harvesting grain with the tractor implement combination shown in Figure 6, he has at his complete control the vertical adjustment of the reel and the harvester part with respect to the other and with respect to the ground level. Due to the use of flexible conduits 126 and 128, any mechanical connections are avoided, and the pivot point of the draft frame 132 on the tractor relative to controlling mechanism need be given no consideration. Moreover it is unnecessary to extend long and complicated mechanical controls from the trailing implement to the tractor. The operator has at his command, by merely moving the control lever 114, the exact position of the reel with respect to the harvester part 136 and the position of the harvester part 136 with respect to the ground. A tractor having built in power lifting mechanisms may be utilized, the push-pull hydraulic units which make possible the use of mechanical lifting arms being entirely independent from the tractor power lift system.

In the modification of Figure 7, a moldboard plow is shown as being directly connected to the tractor. The frame structure 152 of the plow, which includes beams 153 and 154, is quickly connected to an attaching structure 155 which is in turn rigidly secured to the rear axle structure 77 of the tractor. Conventional plow bottoms 156 are mounted on the plow beams 153 and 154. A gauge wheel 157 is floatingly connected by a link 158 with the frame structure of the plow. A link 159 pivotally connected to the link 158 extends upwardly, being pivotally connected to a bell-crank 160 pivoted on the frame 152 of the plow.

A cylinder 161 pivotally connected to an upstanding bracket 162 on the rear plow beam 153 carries a piston 164 which is secured to a piston rod 165. Said piston rod is pivotally secured to the lever 160. This construction provides for adjusting the gauge wheel 157 relative to the frame structure of the plow by any movement of the piston 164 relative to the cylinder 161, thereby regulating the operating depth of the plow. A flexible conduit 166 connected to the cylinder 161 extends to the tractor where it is connected with a cylinder 167. Said cylinder is pivotally connected at 168 with a bracket carried by the rear axle 77 of the tractor. A piston 169 mounted in the cylinder 167 has a forwardly extending piston rod 170 which is pivotally connected to one of the lifting arms 92 which in this construction extends downwardly from its shaft 90. When the arm 92 moves in a clockwise direction, fluid in the cylinder 167 is compressed and forced under pressure into the cylinder 161 moving the piston 164 forwardly and pushing down the gauge wheel 157 thereby raising the plow bottoms 156. When the lifting arm 92 is moved by its hydraulic actuating mechanism in an anti-clockwise direction, the weight of the plow moves the piston 164 rearwardly allowing the plow to operate at greater depth.

A bracket structure, including members 171 and 172 connected to the attaching structure 155, extends rearwardly to form a support for a transverse rock-shaft 173. Said rock-shaft carries an upwardly extending arm 174 which is connected by a link 175 with one of the lifting arms 92. A rearwardly extending arm 176 carried by the shaft 173 is provided with a pin 177 slidable in a slot 178 formed in a member 179. Said member has a downwardly extending portion, which is connected with a bracket 181 secured to the frame 152 of the plow. By movement of the lifting arm 92 in a clockwise direction, the arm 176 is moved upwardly, the pin 177 sliding in the slot 178 until it reaches the upper end of said slot. The entire plow structure, including its gauge wheel, is then lifted from operating position clear of the ground. The slot 178 is of such length as to provide for floating movement of the plow and its gauge wheel during normal plowing operations. Said slot, however, serves as stop means to prevent excessive dropping of the plow due to holes or due to extremely soft conditions when the gauge wheel 157 is not effective in supporting the plow.

In the modification of Figure 7, it will be noted that the operator, by means of the two control members 114 which are within easy access of his reach, can adjust the plow at any time during operation and can with equal ease lift the plow completely from the ground without disturbing the depth adjustment. This is particularly significant in plowing operations as the plow must be removed from the ground before turning and as it is important to again operate at the same depth without readjustment.

It will be apparent from the foregoing description that novel means have been devised for controlling either an implement directly connected to a tractor or one pulled therebehind in trailing relation. This means utilizes in combination a hydraulic fluid system complete in itself with a mechanical member forming part of a tractor power lift mechanism. It enables an operator to use a tractor having any type of power lift mechanism in conjunction with an implement which must be controlled during operation of the tractor. The degree of control obtainable depends upon the characteristics of the tractor power lift mechanism, several types of which are disclosed in this application. Figure 4, for example, shows the simplest type of power lift mechanism now in extensive use. In this mechanism only two positions are obtainable by a half revolution mechanical or hydraulic type of power lift. For that reason a manual adjustment was provided in said construction. Figures 1, 2, and 3 illustrate a construction in which a two-way hydraulic power lift mechanism is provided on the tractor with two-way power being supplied to an implement by means of positive fluid pressure in one direction and spring pressure in the other direction. Figure 5 illustrates another type of pressure applying means for use with the two-way power lift mechanism of Figure 3 in which power may be applied positively in both directions. In the power lift construction of Figures 6 to 12, inclusive, two power lift mechanisms are provided of the follow-through type in which the operator may manually select the position of the power lift arms with the power lift mechanism following and throwing out automatically when the selective point is reached. This two-unit type of mechanism provides for use of the device of the invention with an implement where it is necessary in order to control the implement to independently adjust two different elements of the implement. Two uses of this arrangement are shown in Figures 6 and 7.

The outstanding utility of a device as disclosed in the various modifications is that the hydraulic actuating system may be provided as an attachment which is complete within itself and which does not require connection into the hydraulic system of a hydraulic lift mechanism. Breaking of the fluid conduit or leakage does not affect the tractor power lift mechanism. Moreover these units may be used at different times, on different tractors, and on different implements by merely providing the necessary attaching brackets.

It is the intention to limit the invention only within the scope of the appended claims.

What is claimed is:

1. In combination with a tractor having a power-actuated member thereon, an implement connected to the tractor for free floating movement relative thereto, said implement having a functional implement part and a member movable to adjust said implement part, means for locking said power-operated member in any one of a plurality of positions, and a unitary self-contained hydraulic unit including a cylinder mounted on the tractor and a piston in the cylinder secured to the power-actuated member, a cylinder secured to the implement having a piston therein secured to the implement-adjusting member, and flexible fluid conduit means connecting said cylinders whereby the functional implement part may be accurately adjusted and maintained in adjusted position by the power-actuated member on the tractor during movement of the tractor and movement of the implement relative to the tractor.

2. A hydraulic adjusting device for tractor-attached implements comprising, in combination with a tractor and an implement connected thereto, a power-actuated adjusting member on the tractor, a manually operable means for controlling the application of power from the power plant of the tractor to said member, said means being operable to automatically disengage the power means when said member reaches either of two extreme positions and to be manually operable to disengage the power means at a plurality of intermediate positions, a cylinder connected to the tractor, a piston mounted in said cylinder and secured to said adjusting member, said member being operable to reciprocate the piston within the cylinder, an adjusting member connected to an implement part to be adjusted, said member being operatively connected to a piston, a cylinder in which said piston is mounted for reciprocation, said cylinder being connected to the implement, conduit means extending from the first-mentioned cylinder to the second-mentioned cylinder, said conduit being effective to deliver fluid under pressure developed during the compression stroke of the power-operated piston on the tractor to apply pressure to one side of the piston in the second-mentioned cylinder, and spring means mounted in the second-mentioned cylinder to apply pressure against the piston in a direction opposite to the force applied by the fluid pressure, one of said cylinders being full of fluid when the other is empty, whereby by means of the spring pressure the two cylinder and piston arrangements and the conduit connecting the two form a push-pull device whereby the adjusting member for the implement follows the movement of the power-actuated member on the tractor.

3. In combination, a tractor having a power plant, an implement floatingly connected to the tractor, said implement having a functional implement part adjustably mounted thereon, a unit having one end mounted upon the tractor and the other end mounted upon the implement and readily detachable therefrom for adjusting the implement by force applied at the tractor, said unit having conduit means extending from the tractor to the implement, a first movable part at the end of the conduit means on the tractor, a second movable part at the end of the conduit means on the implement, and a fluid contained in the conduit means such as to cause movement of the first movable part to effect movement of the second movable part, means connecting the second movable part and the implement, external shiftable mechanical means on the tractor for moving the first part and therewith the second movable part for adjustment of the implement, and means connecting the external means and the tractor power plant and including a cylinder, a piston slidably mounted within the cylinder, means connecting the piston and the external mechanical means, and means for supplying fluid to the cylinder to shift the piston and for locking the fluid within the cylinder to prevent movement of the piston in any one of a plurality of positions.

4. In combination, a tractor having a power plant, an implement floatingly connected to the tractor, said implement having a functional implement part adjustably mounted thereon, a unit having one end mounted upon the tractor and the other end mounted upon the implement and readily detachable therefrom for adjusting the implement by force applied at the tractor, said unit having conduit means extending from the tractor to the implement and a fluid contained in the conduit means such as to cause a force applied to the end of the unit on the tractor to be transmitted by the fluid to the end of the unit on the implement, means connecting the end of the unit on the implement to the implement, external mechanical means on the tractor for applying force to the end of the unit on the tractor and therewith force to the end of the unit on the implement for adjusting the implement, and means connecting the tractor power plant and the external mechanical means and including a cylinder, a piston slidably mounted within the cylinder, means connecting the piston and the external mechanical means, and means for supplying fluid to the cylinder to shift the piston and for locking the fluid within the cylinder to prevent movement of the piston in any one of a plurality of positions.

5. In combination, a tractor having a power plant, an implement floatingly connected to the tractor, said implement having a functional implement part adjustably mounted thereon, a readily detachable unit for adjusting the implement by force applied at the tractor, said unit comprising a first device mounted upon the tractor and composed of a cylinder and a piston slidable therein, a second device mounted upon the implement and composed of a cylinder and a piston slidable therein, a conduit connecting the devices, and fluid contained in the conduit and the cylinders, means connecting the piston of the second device and the implement, external mechanical means connected with the piston of the first device for shifting the same and therewith the piston of the second device for adjusting the implement, and means connecting the external mechanical means and the tractor power plant and including a cylinder, a piston slidably mounted within the cylinder, means connecting the piston and the external mechanical means, and means for supplying fluid to the cylinder to shift the piston and for locking the fluid within the cylinder to prevent movement of the piston in any one of a plurality of positions.

6. In combination, a tractor having a power plant, an implement floatingly connected to the tractor, said implement having a functional implement part adjustably mounted thereon, a readily detachable unit for adjusting the implement by force applied at the tractor, said unit comprising a first device mounted upon the tractor and composed of a cylinder and a piston slidable therein, a second device mounted upon the implement and composed of a cylinder and a piston slidable therein, a conduit connecting the devices, and fluid contained in the conduit and the cylinders, means connecting the piston of the second device and the implement, external mechanical means connected with the piston of the first device for shifting the same and therewith the piston of the second device for adjusting the implement, and means connecting the external mechanical means and the tractor power plant and comprising means for holding the piston of the first device in any one of a plurality of positions between the ends of the cylinder of the first device for holding the piston of the second in any one of a plurality of positions between the ends of the cylinder of the second device thereby to hold the implement in any one of a plurality of positions of adjustment.

7. In combination, a tractor having a power plant, an implement floatingly connected to the tractor, said implement having a functional implement part adjustably mounted thereon, a unit having one end mounted upon the tractor and the other end mounted upon the implement for adjusting the implement by force applied at the tractor, said unit having conduit means extending from the tractor to the implement, a first movable part at the end of the conduit means on the tractor, a second movable part at the end of the conduit means on the implement, and a fluid contained in the conduit means such as to cause movement of the first movable part to effect movement of the second movable part, means connecting the second movable part and the implement, external shiftable mechanical means on the tractor for moving the first part and therewith the second movable part for adjustment of the implement, and a fluid-power device connected with the tractor power plant for shifting the external mechanical means.

8. In combination, a tractor having a power plant, an implement floatingly connected to the tractor, said implement having a functional implement part adjustably mounted thereon, a unit having one end mounted upon the tractor and the other end mounted upon the implement for adjusting the implement by force applied at the tractor, said unit having conduit means extending from the tractor to the implement and a fluid contained in the conduit means such as to cause a force applied to the end of the unit on the tractor to be transmitted by the fluid to the end of the unit on the implement, means connecting the end of the unit on the implement to the implement, external mechanical means on the tractor for applying force to the end of the unit on the tractor and therewith force to the end of the unit on the implement for adjusting the implement, and a fluid-power device connected with the tractor power plant for actuating the external mechanical means.

9. In combination, a tractor having a power plant, an implement floatingly connected to the tractor, said implement having a functional implement part adjustably mounted thereon, a unit for adjusting the implement by force applied at the tractor, said unit comprising a first device mounted upon the tractor and composed of a cylinder and a piston slidable therein, a second device mounted upon the implement and composed of a cylinder and a piston slidable therein, a conduit connecting the devices, and fluid contained in the conduit and the cylinders, means connecting the piston of the second device and the implement, external mechanical means connected with the piston of the first device for shifting the same and therewith the piston of the second device for adjusting the implement, and a fluid-power device connected with the tractor power plant for shifting the external mechanical means.

10. The combination specified in claim 9, and further including resilient means for urging the piston of the second device in one direction in its cylinder.

11. In combination, a tractor having a power plant, an adjustable implement connected to the tractor, a readily detachable unit for adjusting the implement by force applied at the tractor, said unit comprising a first device mounted upon the tractor and composed of a cylinder and a piston slidable therein, a second device mounted upon the implement and composed of a cylinder and a piston slidable therein, a first conduit connecting the cylinder at one side of the piston of the first device and the cylinder at one side of the piston of the second device, a second conduit connecting the cylinder at the other side of the piston of the first device and the cylinder at the other side of the piston of the second device, and fluid contained in the conduit and the cylinders, means connecting the piston of the second device and the implement, and external mechanical means connected with the piston of the first device for shifting the same and therewith the piston of the second device for adjusting the implement, and a fluid-power device connected with the tractor power plant for actuating the external mechanical means to shift the piston connected therewith.

12. In combination, a tractor having a power plant, a ground supported implement having an adjustable working part thereon floatingly connected to the tractor, a unit having one end mounted upon the tractor and the other end mounted upon the implement for adjusting the implement by force applied at the tractor, said unit having conduit means extending from the tractor to the implement and a force-transmitting means contained in the conduit means such as to cause a force applied at the end of the unit on the tractor to be transmitted to the end of the unit on the implement, means connecting the end of the unit on the implement to the implement, external mechanical means on the tractor for applying force to the end of the unit on the tractor and therewith force to the end of the unit on the implement for adjusting the implement, and a fluid-power device connected with the tractor power plant for actuating the external mechanical means to apply force to the unit.

13. In combination with a tractor having a pair of independently operable power-actuated members thereon and manual control means for independently adjusting said members to a plurality of positions and to lock said members in any one of the selected positions, an implement connected to the tractor, mechanical lifting linkage mechanism connecting said implement to one of said power-actuated members, said implement having an adjustable implement part thereon, and a hydraulic unit including a first cylinder element and a piston element therein, one of said elements being secured to the implement part to be adjusted, a second cylinder element and a piston element therein, one of said elements being connected to the tractor and the other to one of the power-actuated members thereon, and a flexible fluid conduit connecting said cylinders.

14. In combination with a tractor having an operator's station and a power-actuated member thereon and manually operable control means adjacent the operator's station for shifting said member to any one of a plurality of selected positions, an implement connected to the tractor having a portion adjustable relative to the tractor, a unitary self-contained hydraulic unit including a first cylinder element and a piston element, one of said elements being mounted on the tractor and the other element being secured to the power-actuated member, a second cylinder element and a second piston element mounted therein, one of said elements being connected to the portion of the implement to be adjusted and the other element being connected to a member with respect to which said implement portion is to be adjusted, and a flexible conduit connecting said cylinders.

15. In combination with a tractor having a power-actuated member thereon and manually operable control means for shifting said member to any one of a plurality of positions and locking the member in the selected position, a ground-working implement connected to the tractor having gauge means adjustable relative to the implement for regulating the depth of penetration of the implement, a unitary self-contained hydraulic unit including a first cylinder element and a piston element, one of said elements being mounted on the tractor and the other element being secured to the power-actuated member, said hydraulic unit also including a second cylinder and a second piston mounted therein, one of said elements being connected to the gauge means and the other element being connected to the implement, and a flexible conduit connecting said cylinders.

16. In combination with a tractor having a power-actuated lifting and adjusting member thereon and manually operable means to control the position of said member and to lock it in any one of a plurality of adjusted positions, a ground supported implement floatingly connected to the tractor, said implement having an adjustable implement part and a movable member operative to adjust said implement part and a unitary self-contained hydraulic unit including a cylinder element and a piston element, one of said elements being secured to the tractor and the other element being secured to the power-actuated member, said hydraulic unit including a second cylinder element and a second piston element mounted therein, one of said elements being secured to the implement and the other to the implement-adjusting member, and a flexible fluid conduit member connecting said cylinders whereby adjustment of the implement part from the tractor is accurate and remains in adjusted position for any position of the implement with respect to the tractor.

17. In combination with a tractor having a power-actuated motor thereon and manually operable means to control the position of said member and to lock it in any one of a plurality of adjusted positions, an implement connected to the tractor and having a movable implement part, a movable member to adjust said implement part, and a unitary self-contained hydraulic unit including a cylinder element and a piston element therein, one of said elements being secured to the tractor and the other element being secured to the power-actuated member thereon, said hydraulic unit including a second cylinder element and a second piston element mounted therein, one of said elements being secured to the implement and the other to the implement-adjusting member, said cylinders and pistons being constructed for fluid pressure at either side of the piston, and a pair of flexible fluid conduits connecting said cylinders on opposite sides of the pistons.

18. In a tractor-implement combination, a tractor having a power-lift mechanism thereon including a selectively movable member, an implement frame pivotally connected to the tractor and having a plow connected thereto, gauge means pivotally connected to said frame, and a hydraulic power-lift device including a first cylinder element and a piston element, one of said elements being connected to the gauge means and the other to the frame, a second cylinder element and a second piston element, one of said elements being connected to the tractor and the other to one of the movable members, and a flexible conduit connecting said cylinders and adapted to transmit fluid pressure from one to the other.

19. In a tractor-implement combination, a tractor having two independently operable power-lift mechanisms thereon, each mechanism including a selectively movable member, an implement frame pivotally connected to the tractor and having a plow connected thereto, gauge means pivotally connected to said frame, a hydraulic power-lift device including a first cylinder element and a piston element, one of said elements being connected to the gauge means and the other to the frame, a second cylinder element and a second piston element, one of said elements being connected to the tractor and the other to one of the movable members, and a flexible conduit connecting said cylinders and adapted to transmit fluid pressure from one to the other, and a second power-lift device connected to the other selectively movable member and to the implement frame for lifting the same.

20. A tractor-implement combination including a tractor having a pair of independently-operable, selectively movable power-lift members thereon, an implement frame pivotally connected to the tractor, said frame having a tool connected thereto, lifting means for the frame including linkage connected directly to one of said power-lift members, said linkage including a lost-motion connection to permit floating movement of the frame relative to the tractor during operation, gauge means carried by said frame and adjustable vertically to gauge position of the tool relative to the ground, linkage carried by the frame for adjusting said gauge means, and a hydraulic mechanism including a cylinder and piston connected between the tool and to the gauge means linkage, a cylinder and a piston connected between a point on the tractor and one of the lifting members, and flexible fluid conduit means connecting the two cylinders for transmitting pressure therebetween.

21. A tractor-implement combination including a tractor having a pair of independently operable, movable power-lift members thereon, a plow pivotally connected to the tractor, lifting means for the plow including linkage connected directly to one of said power-lift members, said linkage including a lost-motion connection to permit floating movement of the plow relative to the tractor during operation, a gauge wheel carried by said plow and adjustable vertically to gauge the operating depth of the plow, linkage carried by the plow for adjusting said gauge wheel, and a hydraulic mechanism including a cylinder and piston device mounted on the plow and connected to the gauge-wheel linkage, a cylinder and a piston device mounted on the tractor and connected to one of the lifting members, and flexible fluid conduit means connecting the two cylinders for transmitting pressure therebetween.

22. In combination, a tractor having an operator's station thereon, an implement lifting and adjusting member on the tractor, means operated by the power plant of the tractor for selectively moving said member, control means for said means located adjacent the operator's station, said means being operable to select any position of said power actuating member, a mobile ground supported implement floatingly connected to said tractor to be drawn thereby, said implement including an adjustable functional implement part, means on said implement for regulating the operating position of said implement part, an adjusting element on said implement connected to said last named means, hydraulically operated adjusting means mounted on the implement and connected to said adjusting element and hydraulic means for supplying regulating and adjusting power from the tractor to the implement, said hydraulic means being readily removable from the tractor whereby the implement may be detached from the tractor with the hydraulic controls, said means including a cylinder and a piston mounted on the tractor with the cylinder connected to the tractor and the piston connected to the power actuated member thereon and a fluid conduit connecting said cylinder with the hydraulic unit on the implement for transmitting fluid power thereto through the flexible conduit whereby accurate adjustment of the implement part may be obtained and maintained during travel of the tractor and during movement of the implement in any direction relative to the tractor.

23. In combination, a tractor having an operator's station thereon, an implement lifting and adjusting member on the tractor, means operated by the power plant of the tractor for selectively moving said member, control means for said means located adjacent the operator's station, said means being operable to select any position of said power actuating member, an implement connected to said tractor to be drawn thereby, said implement including an adjustable functional implement part, means on said implement for regulating the operating position of said implement part, an adjusting element on said implement connected to said last named means, hydraulically operated adjusting means mounted on the implement and connected to said adjusting element and hydraulic means for supplying regulating and adjusting power from the tractor to the implement, said hydraulic means being readily removable from the tractor whereby the implement may be detached from the tractor with the hydraulic controls, said means including a cylinder and a piston mounted on the tractor with the cylinder connected to the tractor and the piston connected to the power actuated member thereon and a fluid conduit connecting said cylinder with the hydraulic unit on the implement for transmitting fluid power thereto through the flexible conduit whereby accurate adjustment of the implement part may be obtained and maintained during travel of the tractor.

24. In combination, a tractor having an operator's station thereon, an implement lifting and adjusting member on the tractor, means operated by the power plant of the tractor for selectively moving said member, control means for said means located adjacent the operator's station, said means being selectable to determine any position of said power actuating member, a mobile ground supported implement floatingly connected to said tractor to be drawn thereby, said implement including an adjustable functional implement part, means on said implement for regulating the operating position of said implement part, an adjusting element on said implement connected to said last named means, hydraulically operated adjusting means mounted on the implement and connected to said adjusting element and hydraulic means for supplying regulating and adjusting power from the tractor to the implement, said hydraulic means being readily removable from the tractor whereby the implement may be detached from the tractor with the hydraulic controls, said means including a cylinder and a piston mounted on the tractor with the cylinder connected to the tractor and the piston connected to the power actuated member thereon and a fluid conduit connecting said cylinder with the hydraulic unit on the implement for transmitting fluid power thereto through the flexible conduit whereby accurate adjustment of the implement part may be obtained and maintained during travel of the tractor and during movement of the implement in any direction relative to the tractor.

25. In combination, a tractor having an operator's station thereon, a hydraulically operated implement lifting and adjusting member on the tractor, hydraulically operated means for selectively moving said member, manual control means for actuating said hydraulic means located adjacent the operator's station, said means being selectable by the operator to determine any position of said power actuating member, a mobile ground supported implement floatingly connected to said tractor to be drawn thereby, said implement including an adjustable functional implement part, means on said implement for regulating the operating position of said implement part, an adjusting element on said implement connected to said last named means, hydraulically operated adjusting means mounted on the implement and connected to said adjusting element and power transmitting means for supplying, regulating and adjusting power from the tractor to the implement without the continuity of fluid lines from the tractor hydraulically operated means whereby the implement may be detached from the tractor with the hydraulic adjusting means without making or breaking liquid connections with the hydraulic means on the tractor, said means including a cylinder and a piston mounted on the tractor with the cylinder connected to the tractor and the piston connected to the power actuated member thereon and a fluid conduit connecting said cylinder with the hydraulic unit on the implement for transmitting fluid power thereto through the flexible conduit whereby accurate adjustment of the implement part may be obtained and maintained during travel of the tractor and during movement of the implement in any direction relative to the tractor.

26. In combination with a tractor having an operator's station thereon, a power actuated member on the tractor, means operated from the power plant of the tractor operating said member, means accessible to an operator on said station for controlling said operating means and thereby controlling the position of said power actuated member, means for locking said power operated member in any one of a plurality of adjusted positions, an implement connected to the tractor for movement relative thereto in a plurality of directions, an implement part connected to said implement and movable relative thereto, a member on said implement and connected to said implement part movable to adjust said implement part to thereby control its working position, and a unitary self-contained hydraulic unit including a cylinder mounted on the tractor and a piston in the cylinder secured to the power actuated member, a cylinder secured to the implement having a piston therein secured to the implement adjusting member and flexible fluid conduit means connecting said cylinders, said association of parts providing means whereby an operator on the tractor may control the power lift member thereon during movement of the tractor and thereby through the provision of the self-contained hydraulic unit to selectively and accurately control the working position on the implement part on an implement connected to the tractor during movement of the tractor and implement.

27. In combination with a tractor having an operator's station thereon, a power actuated member on the tractor, means operated from the power plant of the tractor operating said member, means accessible to an operator on said station for controlling said operating means and thereby controlling the position of said power actuated member, means for locking said power operated member in any one of a plurality of adjusted positions, an implement connected to the tractor for movement relative thereto in a plurality of directions, an implement part connected to said implement and movable relative thereto, a member on said implement and connected to said implement part movable to adjust said implement part to thereby control its working position, and a unitary self-contained hydraulic unit including a cylinder mounted on the tractor and a two-way piston in the cylinder secured to the power actuated member, a cylinder secured to the implement having a two-way piston therein secured to the implement adjusting member and a pair of flexible fluid conduit means connecting said cylinders on opposite ends at different sides of the pistons, said association of parts providing means whereby an operator on the tractor may control the power lift member thereon during movement of the tractor and thereby through the provision of the self-contained hydraulic unit to selectively and accurately control the working position of the implement part on an implement connected to the tractor during movement of the tractor and implement.

28. In combination with a tractor having an operator's station thereon, a power actuated member on the tractor, means operated from the power plant of the tractor operating said member, means accessible to an operator on said station for controlling said operating means and thereby controlling the position of said power actuated member, means for locking said power operated member in any one of a plurality of adjusted positions, an implement floatingly connected to the tractor for movement relative thereto in a plurality of directions, a functional implement part connected to said implement and movable relative thereto, a member on said implement and connected to said implement part movable to adjust said implement part to thereby control its working position, and a unitary self-contained hydraulic unit including a cylinder mounted on the tractor and a piston in the cylinder secured to the power actuated member, a cylinder secured to the implement having a piston therein secured to the implement adjusting member and flexible fluid conduit means connecting said cylinders, said association of parts providing means whereby an operator on the tractor may control the power lift member thereon during movement of the tractor and thereby through the provision of the self-contained hydraulic unit selectively and accurately to control the working position of the implement portion on the implement floatingly connected to the tractor during movement of the tractor and implement and during movement of the implement relative to the tractor.

29. In combination with a tractor having an operator's station thereon, a power actuated member on the tractor, means operated from the power plant of the tractor operating said member, means accessible to an operator on said station for controlling said operating means and thereby controlling the position of said power actuated member, means for locking said power operated member in any one of a plurality of adjusted positions, an implement floatingly connected to the tractor for movement relative thereto in a plurality of directions, a functional implement part connected to said implement and movable relative thereto, a member on said implement and connected to said implement part movable to adjust said implement part to thereby control its working position, and a unitary self-contained hydraulic unit including a cylinder mounted on the tractor and a two-way piston in the cylinder secured to the power actuated member, a cylinder secured to the implement having a two-way piston therein secured to the implement adjusting member and a pair of flexible fluid conduit means connecting said cylinders on opposite ends at different sides of the pistons therein, said association of parts providing means whereby an operator on the tractor may control the power lift member thereon during movement of the tractor and thereby through the provision of the self-contained hydraulic unit selectively and accurately control the working position of the implement part on the implement floatingly connected to the tractor during movement of the tractor and implement and during movement of the implement relative to the tractor.

30. In combination with a tractor having an operator's station thereon, a power actuated member on the tractor, means for operating said member from the power plant of the tractor, means accessible to an operator on said station for controlling said operating means and thereby controlling at will the position of said operating means including means for locking said power operated member in any one of a plurality of positions, a flexible extensible power actuated device adapted to be utilized with one portion remotely positioned from the tractor, said device including at the remote portion, a cylinder member and a plunger member mounted for reciprocation in the cylinder member, said device further including an extensible power actuated structure mounted on the tractor, said structure including a second cylinder member and a second plunger member mounted for reciprocation in said cylinder member, one of said second members being mounted on the tractor and the other of said second members being connected to the power-actuated member on the tractor, and a flexible conduit connecting the cylinder member on the tractor-mounted structure with the cylinder member on the extensible device, said conduit providing means for confining a pressure transmitting medium for transmitting power from the plunger member of the tractor-mounted structure to the plunger member of the extensible device, whereby an operator on the tractor may from a remote point by means of the controlling means adjacent the operator's station accurately adjust the extensible device.

31. In combination with a tractor having an operator's station thereon, a power actuated member on the tractor, means for operating said member from the power plant of the tractor, means accessible to an operator on said station for controlling said operating means and thereby controlling at will the position of said operating means including means for locking said power operated member in any one of a plurality of positions, a flexible extensible power actuated device adapted to be utilized with one portion remotely positioned from the tractor, said device including at the remote portion, a cylinder member and a plunger member mounted for reciprocation in the cylinder member, said device further including an extensible power actuated structure mounted on the tractor, said structure including a second cylinder member and a second plunger member mounted for reciprocation in said cylinder member, one of said second members being mounted on the tractor and the other of said second members being connected to the power-actuated member on the tractor, and a flexible conduit connecting the cylinder member on the tractor-mounted structure with the cylinder member on the extensible device, said conduit providing means for confining a pressure transmitting medium for transmitting power from the plunger member of the tractor-mounted structure to the plunger member of the extensible device, whereby an operator on the tractor may from a remote point by means of the controlling means adjacent the operator's station accurately adjust the extensible device, one of the members of the tractor-mounted structure being pivotally connected to the power actuated member on the tractor and the other member thereof being pivotally connected to the tractor whereby by disconnecting said pivotal connections the power actuated device, the flexible conduit and the tractor-mounted structure may be removed as a unit.

32. In combination with a tractor having an operator's station thereon, a power actuated member on the tractor, means for operating said member from the power plant of the tractor, means accessible to an operator on said station for controlling said operating means and thereby controlling at will the position of said operating means including means for locking said power operated member in any one of a plurality of positions, a flexible extensible power actuated device adapted to be utilized with one portion remotely positioned from the tractor, said device including at the remote portion, a cylinder member and a plunger member mounted for reciprocation in the cylinder member, said device further including an extensible power actuated structure mounted on the tractor, said structure including a second cylinder member and a second plunger member mounted for reciprocation in said cylinder member, one of said second members being mounted on the tractor and the other of said second members being connected to the power-actuated member on the tractor, and a flexible fluid conduit communicating with the cylinder member on the tractor-mounted structure with the cylinder member on the extensible device, said conduit providing means for confining fluid under pressure for transmitting power from the plunger member of the tractor-mounted structure to the plunger member of the extensible device, whereby an operator on the tractor may from a remote point by means of the controlling means adjacent the operator's station accurately adjust the extensible device.

33. In combination with a tractor having an operator's station thereon, a power actuated member on the tractor, means operated from the power plant of the tractor for operating said member, means accessible to an operator on said station for controlling said operating means and thereby controlling the position of said power actuated member, means for locking said power operated member against movement in either direction in any one of a plurality of adjusted positions, an implement connected to the tractor for movement relative thereto in a plurality of directions, an implement part connected to said implement and movable relative thereto, a member on said implement and connected to said implement part movable to adjust said implement part to thereby control its working position, and a flexible power transmitting unit comprising a structure including a cylindrical casing member and a power transmitting plunger member slidable with respect to said casing member, one of said members being connected to the tractor and the other member being connected to the power actuated member on the tractor, a second structure including a cylindrical casing member and a power transmitting plunger member slidable with respect to said casing member one of said members being connected to the implement part and the other being connected to the implement adjusting member, and power transmitting means including a flexible conduit connecting the casing member on the tractor mounted structure and the casing member on the implement mounted structure and means within and confined by said conduit for transmitting power from the plunger member of the structure on the tractor to the plunger member of the structure attached to the implement part, whereby an operator on the tractor may selectively and accurately control the working position of the implement part during travel of the tractor and during movement of the implement with respect to the tractor.

34. In combination with a tractor having an operator's station thereon, a power actuated member on the tractor, means operated from the power plant of the tractor for operating said member, means accessible to an operator on said station for controlling said operating means and thereby controlling the position of said power actuated member, means for locking said power operated member against movement in either direction in any one of a plurality of adjusted positions, an implement connected to the tractor for movement relative thereto in a plurality of directions, an implement part connected to said implement and movable relative thereto, a member on said implement and connected to said implement part movable to adjust said implement part to thereby control its working position, and a flexible power transmitting unit comprising a structure including a cylindrical casing member and a power transmitting plunger member slidable with respect to said casing member, one of said members being pivotally connected to the tractor and the other member being pivotally connected to the power actuated member on the tractor, a second structure including a cylindrical casing member and a power transmitting plunger member slidable with respect to said casing member, one of said members being pivotally connected to the implement and the other being pivotally connected to the implement adjusting member, and power transmitting means including a flexible conduit connecting the casing member on the tractor-mounted structure and the casing member on the implement-mounted structure and means within and confined by said conduit for transmitting power from the plunger member of the structure on the tractor to the plunger member of the structure attached to the implement part, whereby an operator on the tractor may selectively and accurately control the working position of the implement part during travel of the tractor and during movement of the implement with respect to the tractor, said pivotal connections being detachable for removal of the transmitting unit.

RUSSEL D. ACTON.